United States Patent
Miyoshi et al.

(10) Patent No.: US 6,919,394 B2
(45) Date of Patent: Jul. 19, 2005

(54) ELECTRICALLY CONDUCTIVE RESIN COMPOSITION AND PRODUCTION PROCESS THEREOF

(75) Inventors: Takaaki Miyoshi, Kimitsu (JP); Kazuhiko Hashimoto, Sodegaura (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 167 days.

(21) Appl. No.: 10/284,091

(22) Filed: Oct. 31, 2002

(65) Prior Publication Data

US 2003/0134963 A1 Jul. 17, 2003

Related U.S. Application Data

(63) Continuation-in-part of application No. 10/240,793, filed on Oct. 4, 2002.

(30) Foreign Application Priority Data

Apr. 26, 2000 (JP) ........................................ 2000-125081

(51) Int. Cl.⁷ ................................................. C08K 3/04
(52) U.S. Cl. ........................ 524/424; 524/438; 524/494
(58) Field of Search ................................ 524/424, 438, 524/494

(56) References Cited

U.S. PATENT DOCUMENTS

| | | | |
|---|---|---|---|
| 3,379,792 A | 4/1968 | Finholt et al. | |
| 5,643,502 A | 7/1997 | Nahass et al. | |
| 6,221,283 B1 | 4/2001 | Dharmarajan et al. | |
| 6,469,093 B1 | 10/2002 | Koevoets et al. | |

FOREIGN PATENT DOCUMENTS

| | | |
|---|---|---|
| EP | 0685527 A1 | 6/1994 |
| JP | 45-997 | 1/1970 |
| JP | 2-163158 A | 6/1990 |
| JP | 2-201811 A | 8/1990 |
| JP | 2-261871 A | 10/1990 |
| JP | 3-014867 A | 1/1991 |
| JP | 4-300956 A | 10/1992 |
| JP | 4-372656 A | 12/1992 |
| JP | 6-2874446 A | 10/1994 |
| JP | 6-306275 A | 11/1994 |
| JP | 7-026081 A | 1/1995 |
| JP | 8-48869 A | 2/1996 |
| JP | 8-217972 A | 8/1996 |
| JP | 8-245876 A | 9/1996 |
| JP | 8-508534 A | 9/1996 |
| JP | 10-310695 A | 11/1998 |
| JP | 2001-302905 A | 10/2001 |
| JP | 2002-129023 A | 5/2002 |
| JP | 2002-146205 A | 5/2002 |
| JP | 2002-146206 A | 5/2002 |
| JP | 2002-194093 A | 7/2002 |
| JP | 2002-194207 A | 7/2002 |
| WO | WO 01/36536 A1 | 5/2001 |

*Primary Examiner*—Kriellion A. Sanders
(74) *Attorney, Agent, or Firm*—Birch, Stewart, Kolasch & Birch, LLP

(57) ABSTRACT

An electrically conductive resin composition comprising a polyamide, a polyphenylene ether, an impact modifier and an electrically conductive filler, not less than 50 wt. % of all of the filler used being preliminarily compounded with a mixture containing the impact modifier and the polyphenylene ether, wherein electrical conductivity having a level in which electrostatic coating is possible, a low coefficient of linear expansion and high surface appearance have been accomplished at the same time, and wherein generation of fines caused by pelletizing on extruding has been suppressed.

28 Claims, No Drawings

ELECTRICALLY CONDUCTIVE RESIN COMPOSITION AND PRODUCTION PROCESS THEREOF

CROSS REFERENCE TO RELATED APPLICATIONS

This application is a continuation-in-part application of U.S. Ser. No. 10/240,793 filed on Oct. 4, 2002, which is a 371 of PCT/JP01/01416 Feb. 26, 2001 the content of which is hereby incorporated by reference.

TECHNICAL FIELD

The present invention relates to a resin composition, wherein electrical conductivity having a level in which electrostatic coating is possible, a low coefficient of linear expansion and high surface appearance have been accomplished at the same time, and further wherein generation of fines caused by pelletizing on extruding has been remarkably suppressed, to a method for producing thereof, and to a molded article thereof.

The composition of the present invention can be used in broad fields such as electrical or electronic parts, OA parts, parts of vehicles, mechanical parts, etc., and above all, it can be suitably used in exterior automobile parts wherein electrostatic coating is possible. Among them, especially, it can be most preferably used for an oversized parts (a back door panel, a bumper, etc.) requiring a low coefficient of linear expansion.

BACKGROUND ART

A polyphenylene ether resin has an excellent mechanical property, electrical property, and thermal resistance, and has an excellent dimensional stability, and therefore it is used in a broad range. However, a processing property of molding thereof by itself is inferior. In order to improve the processing property, the technique of formulating a polyamide therewith is proposed in JP-B-45-997. And at present, it has become a material which has many varied uses.

Recently, an alloy of a polyamide and a polyphenylene ether has been provided with electrical conductivity, and development thereof rapidly progresses for uses as an exterior material of an automobile (a fender, a door panel, etc.) which is possible to be electrostatically coated.

As a property demanding from an exterior material of an automobile, various kinds of properties are mentioned such as electrical conductivity having a level in which electrostatic coating is possible, a low coefficient of linear expansion, thermal resistance, fluidity, etc.

As a technique of providing electrical conductivity having the level in which electrostatic coating is possible, for instance, JP-A-2-201811 discloses a technique of decreasing a value of surface resistance by making a carbon black contained mainly in a polyamide phase. JP-A-4-300296 discloses a technique that a composition comprising a polyamide, a polyphenylene ether, and a carbon black has excellent volume resistivity, fluidity, thermal resistance, and impact strength.

JP-A-8-508534 and U.S. Pat. No. 5,643,502 disclose a composition having excellent impact strength and volume resistivity, by compounding an electrically conductive carbon fibril. And JP-A-8-48869 discloses that a composition having excellent impact strength and volume resistivity can be obtained by compounding an electrically conductive carbon black after compatibilizing a polyamide and a polyphenylene ether.

Further, JP-A-10-310695 discloses a composition having excellent Dart impact strength and electrical conductivity, by using plural polyamides and an electrically conductive carbon black. U.S. Pat. No. 6,221,283 discloses a technique wherein a composition having excellent electrical conductivity can be obtained by restricting the amount of a compatibilizer to that of a specified one.

WO2001/36536 discloses a technique that a composition comprising a polyphenylene ether, a polyamide, a talc, and carbon has excellent electrical conductivity, fluidity, and unnotched Izod impact strength.

Besides these, many applications such as JP-A-2001-302905, JP-A-2002-129023, JP-A-2002-146205, JP-A-2002-146206, JP-A-2002-194207, JP-A-2002-194093, etc were filed.

Recently, in an exterior material of an automobile, an application thereof to an oversized vehicle taken in vision has been studied. In an oversized vehicle, each of parts becomes an oversized scale, and therefore a dimensional change depending on a change of temperature of an outside air is required to be small.

For instance, concerning a material of a fender having a length of 100 cm, when materials having a coefficient of linear expansion of $7 \times 10^{-5}$ (° C.$^{-1}$) and of $9 \times 10^{-5}$ (° C.$^{-1}$) are compared, a difference in dimension of a maximum of about 2 mm will be caused between both of them, when they are compared in a certain condition of temperature [when a difference in temperature is 100° C. (for example, −30° C.~70° C.)].

This discrepancy affects a clearance with a door etc., and in the worst case, an inconvenience such as contacts when opening or closing the door.

Owing to these factors, when an application to an oversized vehicle is considered, a low coefficient of linear expansion is particularly required.

However, with the above-described techniques, electrical conductivity is provided, but a low coefficient of linear expansion has not been attained, and application to these uses cannot be fully conducted.

On the other hand, as a conventional technique of improving a coefficient of linear expansion in an alloy of a polyamide and a polyphenylene ether, for instance, JP-A-2-163158, JP-A-4-372656, and JP-A-6-306275, discloses that a composition wherein an inorganic filler was formulated is useful. However, with these techniques, a concave and a convex due to an inorganic filler appear on a molded piece, and therefore surface appearance is deteriorated, which is not durable to a practical use.

Further, the techniques of providing electrical conductivity and of making a coefficient of linear expansion low, as seen in the above-described conventional techniques, make compositions fragile, there is a problem that a large amount of swarf which is called as "fines caused by pelletizing" is generated in a pelletizing step (a step wherein a strand extruded from an extruder is cut to form pellets) on processing.

These fines caused by pelletizing, in a place of fabrication, attach to a pellet drier, a pneumatic transportation lines of a molding machine, a hopper part of a molding machine, etc., which necessitates cleaning upon a change of resin type causing greatly decreased productivity. Therefore, this matter of the above arts has been an item always demanded to be improved.

Generally, it is difficult to completely remove these fines caused by pelletizing, and is the sole solution to suppress generation thereof.

The present invention aims to solve the problems which have not been solved by the above stated prior art.

It is therefore an object of the present invention to provide a resin composition, wherein electrical conductivity having a level in which electrostatic coating is possible, a low coefficient of linear expansion and high appearance without lifting of a filler have been accomplished, and further wherein, at the same time, generation of fines caused by pelletizing on extruding has been suppressed.

DISCLOSURE OF THE INVENTION

The present inventors have intensively studied to solve the problems as described above, and as a result, surprisingly, they have found that, by preliminarily compounding not less than 50 wt. % of all of the electrically conductive filler used with a mixture containing the impact modifier and the polyphenylene ether, a resin composition, wherein electrical conductivity having a level in which electrostatic coating is possible, a low coefficient of linear expansion, and high surface appearance without lifting of a filler have been accomplished, and further wherein, at the same time, generation of fines caused by pelletizing on extruding has been suppressed, can be obtained. Thus, the present invention has been accomplished.

That is, the resin composition of the present invention comprises a polyamide, a polyphenylene ether, an impact modifier and an electrically conductive filler, wherein not less than 50 wt. % of all of the electrically conductive filler used is preliminarily compounded with a mixture containing the impact modifier and the polyphenylene ether.

The present invention also relates to a process for producing an electrically conductive resin composition characterized in that not less than 50 wt. % of all of the electrically conductive filler used is preliminarily compounded with a mixture containing the impact modifier and the polyphenylene ether, and to a molded article for an exterior use of an automobile comprised of the composition.

BEST MODE TO CARRY OUT THE INVENTION

Hereinafter, the present invention is explained in detail.

A type of a polyamide which can be used in the present invention is any one which has an amide bond {—NH—C(=O)—} in the main chain of the polymer.

Generally, a polyamide can be obtained by a ring opening polymerization of lactams, a condensation polymerization of a diamine and a dicarboxylic acid, and a condensation polymerization of an aminocarboxylic acid, etc., but is not limited thereto.

As the above-described diamine, an aliphatic, an alicyclic, and an aromatic diamine are exemplified, and specifically, tetramethylene diamine, hexamethylene diamine, undecamethylene diamine, dodecamethylene diamine, tridecamethylene diamine, 2,2,4-trimethylhexamethylene diamine, 2,4,4-trimethylhexamethylene diamine, 5-methylnanomethylene diamine, 1,3-bisaminomethyl cyclohexane, 1,4-bisaminomethyl cyclohexane, m-phenylene diamine, p-phenylene diamine, m-xylylene diamine, and p-xylylene diamine, are mentioned.

As the dicarboxylic acid, an aliphatic, an alicyclic, and an aromatic dicarboxylic acid are exemplified, and specifically, adipic acid, suberic acid, azelaic acid, sebacic acid, dodecanoic diacid, 1,1,3-tridecanoic diacid, 1,3-cyclohexane dicarboxylic acid, terephthalic acid, isophthalic acid, naphthalene dicarboxylic acid, dimmer acid, etc., are mentioned.

As the lactams, specifically, ε-caprolactam, enanthlactam, (ω-laurocaprolactam, etc., are mentioned.

Further, as the aminocarboxylic acid, specifically, ε-aminocaproic acid, 7-aminoheptanoic acid, 8-aminooctanoic acid, 9-aminononanoic acid, 11-aminoundecanoic acid, 12-aminododecanoic acid, 13-aminotridecanoic acid, etc., are mentioned.

In the present invention, any of copolymer polyamides can be used, which is obtained by conducting a condensation polymerization singly of or in a mixture of at least two sorts of the above lactams, diamines, dicarboxylic acids and aminocarboxylic acids.

Moreover, polyamides obtained by polymerizing the above lactams, diamines, dicarboxylic acids and aminocarboxylic acids in a reactor for the polymerization to a stage of an oligomer having a low molecular weight, and further polymerizing to a stage thereof having a high molecular weight with such as an extruder, can suitably be used.

As a polyamide especially usefully employed in the present invention, a polyamide 6, a polyamide 6,6, a polyamide 4,6, a polyamide 11, a polyamide 12, a polyamide 6,10, a polyamide 6,12, a polyamide 6/6,6, a polyamide 6/6,12, a polyamide MXD,6 (MXD: m-xylylene diamine), a polyamide 6/MXD,6, a polyamide 6,6/MXD, 6, a polyamide 6,T, a polyamide 6,I, a polyamide 6/6,T, a polyamide 6/6,I, a polyamide 6,6/6,T, a polyamide 6,6/6,I, a polyamide 6/6,T/6,I, a polyamide 6,6/6,T/6,I, a polyamide 6/12/6,T, a polyamide 6,6/12/6,T, a polyamide 6/12/6,I, a polyamide 6,6/12/6,I, etc., are exemplified, and polyamides obtained by copolymerizing plural of polyamides with an extruder or the like can also be usable. A preferable polyamide is a polyamide 6, a polyamide 6,6, a polyamide 6/6,6, and a mixture thereof, and a most preferable one is a polyamide 6,6.

A preferable number average molecular weight of a polyamide used in the present invention is 5,000 to 100,000, preferably 7,000 to 30,000, more preferably 9,000 to 15,000.

The polyamide in the present invention is not restricted to these, and may be a mixture of several polyamides having different molecular weights. For instance, a mixture of a low molecular weight polyamide having a number average molecular weight of not higher than 10,000, and a high molecular weight polyamide having a molecular weight of not lower than 30,000, and a mixture of a low molecular weight polyamide having a number average molecular weight of not higher than 10,000, and a general polyamide having a molecular weight to the extent of 15,000, etc. are exemplified.

A terminal group of a polyamide has an effect on a reaction with a polyphenylene ether. A polyamide resin has generally an amino group and a carboxyl group as terminal groups thereof. Generally, when the concentration of a carboxyl group becomes high, an impact resistance thereof is decreased and fluidity thereof is improved, whereas when the concentration of an amino group becomes high, an impact resistance thereof is improved and fluidity thereof is decreased, A preferable ratio of amino groups/carboxyl groups in the present invention is 9/1 to 1/9, more preferably 8/2 to 1/9, further preferably 6/4 to 1/9.

The concentration of terminal amino groups is preferably at least 10 milliequivalent/kg, more preferably at least 30 milliequivalent/kg.

As a method for adjusting a terminal group of these polyamides, a method known to a person skilled in the art may be used. For instance, addition of diamines and dicarboxylic acids, and addition of a monocarboxylic acid, on polymerization of a polyamide, are mentioned.

Further, for the purpose of improving thermal resistant stability of a polyamide resin, a known metallic type stabilizer as is described in JP-A-1-163262, can be used without any problem.

Among these metallic type stabilizers, CuI, $CuCl_2$, copper acetate, cerium stearate, etc. are particularly preferred. A halogenated salt of a metal alkyl represented by potassium iodide, potassium bromide, etc. also can be used. These may surely be used in combination.

A total amount of the metallic type stabilizer and/or the halogenated salt of a metal alkyl is preferably 0.001 to 1 parts by weight based on 100 parts by weight of a polyamide.

Further, besides the above-described, known additives which may be added to a polyamide, may be present in concentrations of less than 10 parts by weight based on 100 parts by weight of a polyamide.

The polyphenylene ether which can be used in the present invention is a homopolymer or a copolymer or both composed of the structural unit represented by the formula (1) as shown below.

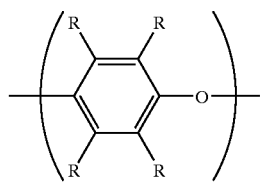

(1)

wherein O represents an oxygen atom, and R independently represents hydrogen, halogen, primary or secondary lower alkyl, phenyl, haloalkyl, aminoalkyl, hydrocarbonoxy, or halohydrocarbonoxy, with a proviso that at least two carbon atoms are between a halogen atom and an oxygen atom.

As a specific example of the polyphenylene ether according to the present invention, for instance, poly(2,6-dimethyl-1,4-phenylene ether), poly(2-methyl-6-ethyl-1,4-phenylene ether), poly(2-methyl-6-phenyl-1,4-phenylene ether), poly(2,6-dichloro-1,4-phenylene ether), etc., are exemplified, and further a copolymer of a polyphenylene ether such as a copolymer of 2,6-dimethylphenol with other phenols (for example, a copolymer with 2,3,6-trimethylphenol, and a copolymer with 2-methyl-6-butylphenol as described in JP-B-52-17880), is exemplified. Among these, the most preferable polyphenylene ether is poly(2,6-dimethyl-1,4-phenylene ether), a copolymer of 2,6-dimethylphenol with 2,3,6-trimethylphenol, or a mixture thereof.

Any known method can be employed for producing polyphenylene ethers used in the present invention. For example, methods as described in U.S. Pat. Nos. 3,306,874, 3,306,875, 3,257,357, and 3,257,358; JP-A-50-51197, JP-A-63-152628, etc. are exemplified.

A reduced viscosity of a polyphenylene ether as can be used in the present invention ($\eta_{sp/c}$:0.5 g/dl, in a solution of chloroform, measured at 30° C.) is preferably in the range of 0.15 to 0.70 dl/g, more preferably in the range of 0.20 to 0.60 dl/g, most preferably in the range of 0.40 to 0.55 dl/g.

In the present invention, even a blend of at least two sorts of polyphenylene ethers having different reduced viscosities can be used without any problem. For instance, a mixture of a polyphenylene ether having a reduced viscosity of not higher than 0.45 dl/g and a polyphenylene ether having a reduced viscosity of not lower than 0.50 dl/g, a mixture of a low molecular weight polyphenylene ether having a reduced viscosity of not higher than 0.40 dl/g and a polyphenylene ether having a reduced viscosity of not lower than 0.50 dl/g, etc., are exemplified, but of course, it is not limited thereto.

Concerning a polyphenylene ether usable in the present invention, an organic solvent, from the polymerization, may reside therein in an amount of less than 5% by weight based on 100 parts by weight of a polyphenylene ether. It is difficult to completely remove the organic solvent owing to a solvent for a polymerization at a drying step after polymerization, and it usually remains present in the range of several hundreds ppm to several %. As the organic solvent from the polymerization as stated herein, at least one of each of isomers of toluene, and xylene, ethylbenzene, alcohols having a carbon number of 1 to 5, chloroform, dichloromethane, chlorobenzene, dichlorobenzene, etc., are exemplified.

Further, a polyphenylene ether which can be used in the present invention may be a wholly or a partly modified polyphenylene ether.

The modified polyphenylene ether referred to herein means a polyphenylene ether which has been modified with at least one sort of a modifying compound which has in the molecular structure thereof at least one C—C double bond or triple bond, and has at least one of a carboxylic acid group, an acid anhydride group, an amino group, a hydroxyl group, or a glycidyl group.

As a method for producing the modified polyphenylene ether, (1) a method for reacting a polyphenylene ether with a modifying compound in a presence or absence of a radical initiator, in the range of a temperature of not lower than 100° C. and lower than the glass transition temperature of the polyphenylene ether, and without melting the polyphenylene ether, (2) a method for reacting it with a modifying compound by compounding in the presence or absence of a radical initiator, and in the range of a temperature of not lower than the glass transition temperature of a polyphenylene ether and not higher than 360° C., (3) a method for reacting in a solution a polyphenylene ether with a modifying compound in the presence or absence of a radical initiator, at a temperature of lower than a glass transition temperature of the polyphenylene ether, etc., are exemplified. Any of these methods may be usable, but methods (1) and (2) are preferable.

Next, at least one sort of a modifying compound which has, in the molecular structure thereof, at least one C—C double bond or triple bond, and at least one of: a carboxylic acid group, an acid anhydride group, an amino group, a hydroxyl group, or a glycidyl group, is specifically explained.

As a modifying compound which has in the molecule thereof at least one C—C double bond, and a carboxylic acid group or an acid anhydride group at the same time, a maleic acid, a fumaric acid, a chloromaleic acid, cis-4-cyclohexene-1,2-dicarboxylic acid, an acid anhydride thereof, etc., are exemplified. Especially, a fumaric acid, a maleic acid, and a maleic anhydride are preferred, and a fumaric acid and a maleic anhydride are particularly preferred.

Further, those wherein at least one or two carboxyl groups among carboxyl groups of these unsaturated dicarboxylic acids, have become an ester, can also be used.

As a modifying compound which has in the molecule thereof at least one C—C double bond and a glycidyl group at the same time, allylglycidyl ether, glycidyl acrylate, glycidyl methacrylate, an epoxidized natural oil and fat, etc., are exemplified. Among these, glycidyl acrylate and glycidyl methacrylate are especially preferred.

As a modifying compound which has in the molecule thereof at least one C—C double bond and a hydroxyl group at the same time, an unsaturated alcohol having a general formula $C_nH_{2n-3}OH$ (n is a positive integer), and an unsaturated alcohol having a general formula $C_nH_{2n-5}OH$, or $C_nH_{2n-7}OH$ (n is a positive integer), etc., such as allyl alcohol, 4-pentene-1-ol, 1,4-pentadiene-3-ol, etc., are exemplified.

The above-described modifying compound may be used singly or in a combination.

An amount of the modifying compound to be added on producing a modified polyphenylene ether is preferably 0.1 to 10 parts by weight, more preferably 0.3 to 5 parts by weight, based on 100 parts by weight of a polyphenylene ether.

A preferable amount of a radical initiator on producing a modified polyphenylene ether by using the radical initiator is preferably 0.001 to 1 parts by weight, based on 100 parts by weight of a polyphenylene ether.

A ratio of the modifying compound added among a modified polyphenylene ether is preferably 0.01 to 5% by weight, more preferably 0.1 to 3% by weight.

In the modified polyphenylene ether, an unreacted modifying compound and/or a polymer of the modifying compound may reside.

Furthermore, to reduce the amount of the unreacted modifying compound and/or the polymer of the modifying compound which reside in a modified polyphenylene ether, on producing the modified polyphenylene ether, if necessary, a compound having an amide bond and/or an amino group may be used.

The compound having an amide bond as herein said, means a compound having a structure of an amide bond {—NH—C(=O)—} in the molecular structure thereof, and a compound having an amino group means a compound having a structure of {—NH$_2$} at least one of the terminal end thereof. As a specific example of these compounds, aliphatic amines such as octyl amine, nonyl amine, tetramethylene diamine, hexamethylene diamine, etc., aromatic amines such as aniline, m-phenylenediamine, p-phenylenediamine, m-xylylenediamine, p-xylylenediamine, etc., a product obtainable by reacting the above-described amines with a carboxylic acid or a dicarboxylic acid, etc., lactams such as ε-caprolactam, etc., and a polyamide resin, etc., are exemplified, but it is not limited thereto.

A preferable amount of these compounds having an amide bond or an amino group is not less than 0.001 parts by weight and less than 5 parts by weight, preferably not less than 0.01 parts by weight and less than 1 parts by weight, more preferably not less than 0.01 parts by weight and less than 0.1 parts by weight, based on 100 parts by weight of a polyphenylene ether.

Moreover, in the present invention, a styrene type thermoplastic resin may be contained in an amount of less than 50 parts by weight based on 100 parts by weight of the total amount of the polyamide and the polyphenylene ether.

The styrene type thermoplastic resin as referred to in the present invention, includes homopolystyrenes, rubber-modified polystyrenes (HIPS), styrene-acrylonitrile copolymers (AS resin), styrene-rubber-like copolymer-acrylonitrile copolymers (ABS resin).

Further, the additives which are possible to be added to a polyphenylene ether, may be added in an amount of less than 10 parts by weight based on 100 parts by weight of a polyphenylene ether.

Next, an impact modifier which can be used in the present invention is explained.

An impact modifier which can be used in the present invention is at least one selected from the group consisting of a block copolymer of an aromatic vinyl compound and a conjugated diene compound composed of a polymer block mainly consisting of an aromatic vinyl compound and a polymer block mainly consisting of a conjugated diene compound, a hydrogenated product thereof, and an ethylene-α-olefin copolymer.

As a specific example of an aromatic vinyl compound which can be used in a block copolymer of an aromatic vinyl compound and a conjugated diene compound in the present invention, styrene, α-methyl styrene, vinyl toluene, etc., are mentioned, and at least one compound selected from these is used. Among these, styrene is particularly preferred.

As a specific example of a conjugated diene compound, butadiene, isoprene, piperylene, 1,3-pentadiene, etc., are mentioned, and at least one compound selected from these is used. Among these, butadiene, isoprene, and a combination thereof is preferred.

Concerning a micro-structure of a soft segment in the block copolymer, a 1,2-vinyl content or the total of a 1,2-vinyl content and a 3,4-vinyl content, is preferably from 5 to 80%, more preferably from 10 to 50%, most preferably from 10 to 40%.

The block copolymer according to the present invention is a block copolymer composed of a polymer block (A) mainly consisting of an aromatic vinyl compound and a polymer block (B) mainly consisting of a conjugated diene compound, having the linking structure of each blocks of preferably at least one selected from the group consisting of an AB type, an ABA type, and an ABAB type, and more preferably at least one selected from the group consisting of an ABA type, and an ABAB type. These may be in a mixture.

Further, the block copolymer of an aromatic vinyl compound and a conjugated diene compound which can be used according to the present invention is preferably a hydrogenated block copolymer. The hydrogenated product of a block copolymer of an aromatic vinyl compound and a conjugated diene compound means what has been obtained by conducting a hydrogenation treatment of the above-stated block copolymer of an aromatic vinyl compound and a conjugated diene compound and by controlling an aliphatic double bond of a polymer block segment mainly consisting of a conjugated diene compound in a range of over 0 to 100%. A hydrogenated ratio of a hydrogenated product of the block copolymer is preferably at least 50%, more preferably at least 80%, most preferably at least 98%.

These block copolymers can be also used without any problem as a mixture of an unhydrogenated block copolymer and a hydrogenated block copolymer.

Specifically, a mixture of a low molecular weight block copolymer having a number average molecular weight of less than 120,000 and a high molecular weight block copolymer having a number average molecular weight of not less than 120,000 is desirable.

The number average molecular weight according to the present invention means a number average molecular weight which is measured with an ultraviolet spectrometric detector [UV-41: manufactured by Showa Denko Co.] using a gel permeation chromatography device [GPC SYSTEM 21: manufactured by Showa Denko Co.] and converted by using a standard polystyrene [Solvent: chloroform, temperature:

40° C., column: a sample side (K-G, K-800RL, K-800R), a reference side (K-805L×2), a flow rate 10 ml/min, a wave length measured 254 nm, pressure 15 to 17 kg/cm²]. A component having a low molecular weight due to inactivation of a catalyst on polymerization is sometimes detected, but in the case, the component having a low molecular weight is not included in the calculation of a molecular weight. Usually, a correctly calculated molecular weight distribution (a weight average molecular weight/a number average molecular weight) is in the range of 1.0 to 1.1.

A weight ratio of the low molecular weight block copolymer to the high molecular weight block copolymer is; the low molecular weight block copolymer/the high molecular weight block copolymer =95/5 to 5/95, preferably 90/10 to 10/90.

Moreover, in the present invention, by using as a low molecular weight block copolymer a block copolymer having one polymer block mainly composed of an aromatic vinyl compound whose number average molecular weight is 20,000 or more, an additional effect of further improvement in thermal resistance can be attained.

The number average molecular weight of one polymer block mainly composed of an aromatic vinyl compound can be calculated according to the formula as follows, using the above-described number average molecular weight of a block copolymer.

$$Mn_{(a)}=\{Mn \times a/(a+b)\}/N$$

[In the above formula, $Mn_{(a)}$ represents a number average molecular weight of one polymer block mainly composed of an aromatic vinyl compound, Mn: a number average molecular weight of a block copolymer, a: wt. % of all of polymer blocks mainly composed of an aromatic vinyl compound in a block copolymer, b: wt. % of all of polymer blocks mainly composed of a conjugated diene compound in a block copolymer, and N: the number of polymer blocks mainly composed of an aromatic vinyl compound in a block copolymer.]

In the present invention, a preferable range of a content of a polymer block mainly composed of an aromatic vinyl compound in a low molecular weight block copolymer is not less than 55 wt. % and less than 90 wt. %. By using as a low molecular weight block copolymer a block copolymer having the above range of a polymer blocks mainly composed of an aromatic vinyl compound, thermal resistance can be improved.

Therefore, it is more preferred.

Further, in the present invention, by using as a low molecular weight block copolymer a mixture of a block copolymer having not less than 55 wt. % and less than 90 wt. % of a polymer block mainly composed of an aromatic vinyl compound and a block copolymer having not less than 20 wt. % and less than 55 wt. % of a polymer block mainly composed of an aromatic vinyl compound, fluidity can be improved.

Further, as the block copolymer of the present invention, what has preliminarily been mixed with an oil having a paraffin as a main component thereof, may be used. By preliminarily mixing with an oil having a paraffin as a main component thereof, processability of a resin composition can further be improved.

The preferable amount of oil is not more than 70 parts by weight, based on 100 parts by weight of the block copolymer. When more than 70 parts by weight is present, the handling property thereof is inferior.

The oil having a paraffin as a main component thereof, referred to herein, means a mixture of a hydrocarbon type compound comprised of three combined components of a compound containing an aromatic ring, a compound containing a naphthenic ring, and a paraffin type compound, and having a weight average molecular weight of a range of 500 to 10000, which has a content of the paraffin type compound of not lower than 50% by weight.

More preferably, it is comprised of 50 to 90% by weight of a paraffin type compound, 10 to 40% by weight of a compound containing a naphthenic ring, and not more than 5% by weight of a compound containing an aromatic ring.

The oil having a paraffin as a main component thereof is commercially available, and for example, PW 380, manufactured by Idemitsu Kosan Co., Ltd., is mentioned.

Concerning the block copolymer of an aromatic vinyl compound and a conjugated diene compound, a combination thereof having different linking styles, having different molecular weights, having different sorts of an aromatic vinyl compound, having different sorts of a conjugated diene compound, having different 1,2-vinyl contents or 1,2-vinyl contents and 3,4-vinyl contents, having different contents of an aromatic vinyl compound component, or having different hydrogenated ratios, etc., may be used in a mixture.

As an ethylene-α-olefin copolymer which can be used in the present invention, an ethylene-α-olefin copolymer as described in JP-A-2001-302911 can be used.

An impact modifier which can be used in the present invention, may be a wholly or a partly modified impact modifier.

The functionalized impact modifier referred to herein means an impact modifier which has been functionalized with at least one sort of a functionalizing agent which has in the molecular structure thereof at least one C—C double bond or triple bond, and has at least one of a carboxyl acid group, an acid anhydride group, an amino group, a hydroxyl group, or a glycidyl group.

As a method for producing the functionalized impact modifier, (1) a method for reacting it with the functionalizing agent by compounding in presence or absence of a radical initiator, and in the range of temperature of not lower than a softening temperature of the impact modifier and not higher than 250° C., (2) a method for reacting in a solution an impact modifier with the functionalizing agent in a presence or absence of a radical initiator, at a temperature of not higher than the softening temperature of the impact modifier, (3) a method for reacting an impact modifier with the functionalizing agent in a presence or absence of a radical initiator, at a temperature of not higher than the softening temperature of the impact modifier, and without melting the impact modifier and the functionalizing agent, etc., are exemplified.

Any of these methods may be usable, but the method of (1) is preferable, and further in the method of (1), conducted in the presence of a radical initiator, is most preferable.

As the at least one sort of a functionalizing agent which has, in the molecular structure thereof, at least one C—C double bond or triple bond, and has at least one of a carboxyl acid group, an acid anhydride group, an amino group, a hydroxyl group, or a glycidyl group, as herein so called, the same as the functionalizing agent mentioned concerning the modified polyphenylene ether, can be used.

The preferable amount ratio of a polyamide, a polyphenylene ether, and an impact modifier in the present invention, is 30 to 70 parts by weight of a polyamide, 20 to 50 parts by weight of a polyphenylene ether, and 5 to 30 parts by weight of an impact modifier, more preferably 40 to 60 parts by weight of a polyamide, 30 to 40 parts by weight of a polyphenylene ether, and 5 to 15 parts by weight of an impact modifier, when the total amount of these three components is considered as 100 parts by weight.

Next, an electrically conductive filler which can be used in the present invention is explained below.

An electrically conductive filler which can be used in the present invention, is an organic or inorganic filler which has ability to provide a non-electrically conductive material with electrical conductivity, whose shape may be, that of a particle, a flake, or a fiber. As an example thereof, an electrically conductive carbon black, a carbon fibril represented by a carbon nanotube, a carbon nanofiber, a carbon fiber, graphite, etc. are exemplified. Among these, an electrically conductive carbon black, a carbon nanotube, and a carbon nanofiber are preferably used.

An electrically conductive carbon black, which can be used in the present invention, is a carbon black having an amount of absorbing dibutyl phthalate (DBP) of not less than 250 ml/100g, preferably having an amount of absorbing dibutyl phthalate (DBP) of not less than 300 ml/100g, more preferably having an amount of absorbing dibutyl phthalate (DBP) of not less than 350 ml/100 g. The amount of absorbed DBP as stated herein, means a value as measured by the method as determined by ASTM D 2414. Further, as an electrically conductive carbon black which can be used in the present invention, a carbon black having a BET surface area of not smaller than 200 $m^2/g$, is preferred, and that having a BET surface area of not smaller than 400 $m^2/g$ is more preferred. An electrically conductive carbon black which is commercially available, is exemplified, a Ketjen black EC and a Ketjen black EC-600JD, etc. manufactured by Ketjen Black International Co., are exemplified.

A carbon nanotube which can be used in the present invention means a carbon type fiber having a fiber diameter of shorter than 75 nm, a hollow structure, and no or few branches as described in U.S. Pat. No. 4,663,230, U.S. Pat. No. 4,663,230, U.S. Pat. No. 5,165,909, U.S. Pat. No. 5,171,560, U.S. Pat. No. 5,578,543, U.S. Pat. No. 5,589,152, U.S. Pat. No. 5,650,370, and U.S. Pat. No. 6,235,674. That having a coil shape wherein a spiral revolves with a pitch of not longer than 1 μm, is also included therein. As a commercially available one, Hyperion manufactured by Hyperion Catalyst International, is exemplified.

A carbon nanofiber which can be used in the present invention means a carbon type fiber having a fiber diameter of not shorter than 75 nm, a hollow structure, and many branched structures. As a commercially available one, VGCF, VGNF, etc. manufactured by Showa Denko Co., are exemplified.

A carbon fiber which can be used in the present invention includes all fibers which are obtained by calcinating and carbonizing in an inert atmosphere at a temperature of 1000° C. to 3500° C. a fiber wherein a polyacrylonitrile (PAN), a pitch, etc. were used as a raw material. A preferable diameter of the fiber is 3 to 30 μm, 5 to 20 μm is more preferred.

A graphite which can be used in the present invention includes not only what is obtained by heating anthracite, or pitch, etc. at a high temperature in an arc furnace, but also a graphite which is naturally produced. Graphite particles preferably have an average diameter of 0.1 to 50 μm, more preferably 1 to 40 μm, most preferably 1 to 30 μm.

A preferable amount of the electrically conductive filler is 0.01 to 5 parts by weight, preferably 0.1 to 3 parts by weight, when the amounts of all of the components other than an electrically conductive filler is considered as 100 parts by weight. When the amount is less than 0.01 parts by weight, electrical conductivity cannot be effected. And when the amount is over 5 parts by weight, fluidity deteriorates.

Further, in the present invention, a compatibilizer may be added when the composition is produced. A main purpose of using the compatibilizer is to improve a physical property of a polyamide-polyphenylene ether mixture. The compatibilizer which can be used in the present invention means a multifunctional compound which interacts with a polyphenylene ether, a polyamide, or both of them. In any case, it is preferred that the resulting polyamide-polyphenylene ether mixture exhibits an improved compatibility.

Examples of a compatibilizer which can be used in the present invention are described in detail in JP-A-8-048869, JP-A-9-124926, etc., and all of these known compatibilizers can be used, and also can be used in combination.

Among these various kinds of a compatibilizer, as an especially preferable compatibilizer a maleic acid, a maleic anhydride, and a citric acid are exemplified.

A preferable amount of the compatibilizer in the present invention is 0.1 to 20 parts by weight based on 100 parts by weight of the amount of a mixture of a polyamide and a polyphenylene ether, and a more preferable one is 0.1 to 10 parts by weight.

In the present invention, it is essential to preliminarily compound that an electrically conductive filler with an impact modifier and a polyphenylene ether.

An amount of the electrically conductive filler which is preliminarily compounded with a mixture containing an impact modifier and a polyphenylene ether, is not less than 50 wt. %, more preferably not less than 60 wt. %, most preferably not less than 70 wt. % when that of all of the filler used is considered as 100 wt. %.

In the present invention, a more preferable method of addition of an electrically conductive filler which is preliminarily compounded with an impact modifier and a polyphenylene ether is to add the filler in the form of a master batch compounded with at least one selected from the group consisting of a polyphenylene ether, an impact modifier and a polyamide. By preliminarily making a form of a master batch, surface appearance of a molded piece after the resin has been left inside the cylinder of the molding machine can be improved.

A preferable ratio of the electrically conductive filler in a master batch is 5 to 40 wt. %, more preferably 8 to 25 wt. %, when the total amount of a master batch is considered as 100 wt. %.

As a preferable method for producing the master batch, a method for compounding using a biaxial extruder or a kneader is preferred. Above all, especially, a method for adding an electrically conductive filler after at least one selected from the group consisting of a polyphenylene ether, an impact modifier, and a polyamide has been melted, is preferred. Specifically, a biaxial extruder or a kneader having at least one feed opening respectively at an upstream and a downstream is used, at least one selected from the group consisting of a polyphenylene ether, an impact modifier, and a polyamide is supplied from a feed opening at an upstream, and is melted, and then an electrically conductive filler is added from a feed opening at a downstream, and they are compounded.

It is preferred that the rest of an electrically conductive filler except for the electrically conductive filler which is preliminarily compounded with an impact modifier and a polyphenylene ether, is compounded in the presence of a polyamide. In this case, the following methods are mentioned: (1) all of the rest of the electrically conductive filler is added with the polyamide, (2) all of the rest of the electrically conductive filler is added after the polyamide and the polyphenylene ether are compounded, (3) a part of the rest of the electrically conductive filler is added with the polyamide, and the remaining rest is added after the polyamide and the polyphenylene ether which are compounded.

An amount of an electrically conductive filler compounded in the presence of a polyamide is less than 50 wt. %, more preferably less than 40 wt. %, most preferably less than 30 wt. %, when the total amount of all the electrically conductive filler used is considered as 100 wt. %.

When all of the rest of an electrically conductive filler is added with a polyamide (the above (1)), it is desirable to add the rest of the electrically conductive filler in a form of a polyamide master batch which is preliminarily compounded with a polyamide. A preferable concentration of the electrically conductive filler in a polyamide master batch is in the range of 5 wt. % to 15 wt. %, in case where the electrically conductive filler is an electrically conductive carbon black, and 15 wt. % to 40 wt. %, in case where the electrically conductive filler is other than an electrically conductive carbon black.

When a part of the rest of an electrically conductive filler is added with a polyamide, and the remaining rest is added after the polyamide and the polyphenylene ether are compounded (the above (3)), a preferable amount ratio of the electrically conductive filler is in 90/10 to 10/90 in terms of an amount ratio of [an electrically conductive filler added with a polyamide]/[an electrically conductive filler added after compounding]. Also in this case, an electrically conductive filler added with a polyamide is desired to be in a form of a master batch with a polyamide.

In the present invention, besides the above-described components, if necessary, an additive component may be added, so long as it does not harm the effect of the present invention.

Examples of the additive component are enumerated as follows.

That is, another thermoplastic resin such as a polyester, a polyolefin, etc., an inorganic filler (talc, kaolin, xonotlite, wollastonite, titanium oxide, potassium titanate, a glass fiber, etc.), a known close contact modifier to enhance affinity between an inorganic filler and a resin, a flame retardant (a halogenated resin, a silicone type flame retardant, magnesium hydroxide, aluminium hydroxide, an organic phosphoric ester compound, ammonium polyphosphate, red phosphorus, etc.), a fluorine type polymer showing a preventing effect of dropping, a plasticizer (an oil, a low molecular weight polyolefin, a polyethylene glycol, a fatty ester, etc.), an assistant to a flame retardant such as antimony trioxide, etc., a coloring agent such as carbon black, etc., an antistatic agent, various kinds of a peroxide, zinc oxide, zinc sulfide, an antioxidant, an ultraviolet absorber, a light stabilizer, etc., are exemplified.

A total amount of the additive component added is specifically in a range of not more than 100 parts by weight based on 100 parts by weight of the total amount of a polyamide, a polyphenylene ether, and an impact modifier.

As a specific processing machine to obtain the composition of the present invention, for instance, a monoaxial extruder, a biaxial extruder, a roll, a kneader, a Brabender Plastograph, a Bambury mixer, etc., are mentioned. Among them, a biaxial extruder is preferable, and particularly a biaxial extruder, which is provided with a feed opening at an upstream and at least one feed opening at a downstream, is most preferable.

A temperature of compounding thereon is not especially limited, but, a condition so that a suitable composition can be obtained may be optionally selected from the range of 240 to 360° C.

In preferred methods of the present invention, a biaxial extruder, which is provided with a feed opening at an upstream and at least one feed opening at a downstream is used, and: (1) an impact modifier, a polyphenylene ether, and an electrically conductive filler having the amount of not less than 50 wt. % when the total amount of all the electrically conductive filler used is considered as 100 wt. % are supplied from a feed opening at an upstream, and are compounded, and then a polyamide and all of the rest of an electrically conductive filler are supplied from a feed opening at a downstream, and they are further compounded;

(2) an impact modifier, a polyphenylene ether, and an electrically conductive filler having the amount of not less than 50 wt. % when the total amount of all the electrically conductive filler used is considered as 100 wt. % are supplied from a feed opening at an upstream, and are compounded, and then a polyamide is supplied from the first feed opening at a downstream and is compounded, and all of the rest of an electrically conductive filler is supplied from the second feed opening at a downstream, and they are further compounded;

(3) a method wherein an impact modifier, a polyphenylene ether, and an electrically conductive filler having the amount of not less than 50 wt. % when the total amount of all the electrically conductive filler used is considered as 100 wt. % are supplied from a feed opening at an upstream, and are compounded, and then a polyamide and a part of the rest of an electrically conductive filler are supplied from the first feed opening at a downstream, and are compounded, and all of the remaining rest is supplied from the second feed opening at a downstream, and they are further compounded. However, the methods are not limitative thereto.

The composition of the present invention thus obtainable can be molded to produce molded articles for various sorts of parts, by various conventionally known methods, for instance, such as injection molding.

As the various sorts of parts, for instance, parts in the electrical or electronic fields including materials for an IC tray, a chassis for various kinds of disc players, etc., and a cabinet, etc.; OA parts or mechanical parts including various kinds of computers, accessory parts thereof, etc.; exterior parts including a cowl for a motorbike, a fender, a door panel, a front panel, a rear panel, a locker panel, a rear bumper panel, a back door garnish, an emblem garnish, a panel for a feeding port of a fuel, an over fender, an outer door handle, a door mirror housing, a bonnet air intake, a bumper, a bumper guard, a roof rail, a roof rail leg, a pillar, a pillar cover, a wheel cover, various kinds of air parts represented by a spoiler, etc., various kinds of lacing, and an emblem for an automobile; interior parts represented by an instrument panel, a console box, a trim, etc. for an automobile; are exemplified.

Among them, the composition is particularly suitable for exterior automobile parts which are to be subjected to electrostatic coating. Especially, it can be most preferably used as an oversized parts (a rear panel, a bumper, etc.) requiring a low coefficient of linear expansion.

EXAMPLES

Hereinafter, the present invention is explained in detail by referring to examples and comparative examples.
A Raw Material Used:
(1) A Polyphenylene Ether (Hereinafter Abbreviated as "PPE")

Poly(2,6-dimethyl-1,4-phenylene ether)
A reduced viscosity: 0.42 dl/g
(2) A Polyamide 66 (Hereinafter Abbreviated as "PA-66")
A number average molecular weight: 14,000
A concentration of a terminal amino group: 30 milli equivalent/kg
A concentration of a terminal carboxyl group: 110 milli equivalent/kg
This contains as a minute amount of a stabilizer component, 30 ppm of CuI and 350 ppm of KI. A low molecular weight polyamide 66 (hereinafter abbreviated as "PA-66L")
A number average molecular weight: 9,100
A concentration of a terminal amino group: 55 milli equivalent/kg
A concentration of a terminal carboxyl group: 65 milli equivalent/kg
This contains as a minute amount of a stabilizer component, 100 ppm of a copper type thermal stabilizer and 800 ppm of a salt of a metallic stearate.
(3) An Impact Modifier
(3-1) A Block Copolymer Having a High Molecular Weight (Hereinafter Abbreviated as "SEBS-H1")
A linking style: Polystyrene-hydrogenated polybutadiene-polystyrene
A number average molecular weight: 246,000
A number average molecular weight per one polystyrene block: 40,600
A bound styrene content: 33%
A 1,2-vinyl content: 33%
A hydrogenation ratio of a polybutadiene: 98% or more
(3-2) A Block Copolymer Having a Low Molecular Weight-1 (Hereinafter Abbreviated as "SEBS-L1")
A linking style: Polystyrene-hydrogenated polybutadiene-polystyrene
A number average molecular weight: 98,500
A number average molecular weight per one polystyrene block: 14,300
A bound styrene content: 29%
A 1,2-vinyl content: 32%
A hydrogenation ratio of a polybutadiene: 98% or more
(3-3) A Block Copolymer Having a Low Molecular Weight-2 (Hereinafter Abbreviated as "SEBS-L2")
A linking style: Polystyrene-hydrogenated polybutadiene-polystyrene
A number average molecular weight: 115,000
A number average molecular weight per one polystyrene block: 34,500
A bound styrene content: 60%
A 1,2-vinyl content: 35%
A hydrogenation ratio of a polybutadiene: 98% or more
(3-4) A Block Copolymer Having a Low Molecular Weight-3 (Hereinafter Abbreviated as "SEBS-L3")
A linking style: Polystyrene-hydrogenated polybutadiene-polystyrene
A number average molecular weight: 51,000
A number average molecular weight per one polystyrene block: 7,400
A bound styrene content: 29%
A 1,2-vinyl content: 32%
A hydrogenated ratio of a polybutadiene: 98% or more
(4) An Electrically Conductive Filler
(4-1) An Electrically Conductive Carbon Black (Hereinafter Abbreviated as "KB")
Trade name: Ketjen Black EC-600JD (manufactured by Ketjen Black International Co.)
An amount of absorbing oil DBP: 495 ml/100g
A BET surface area: 1,270 m$^2$/g
(5) An Electrically Conductive Filler Master Batch
(5-1) PA66L/KB Master Batch (Hereinafter Abbreviated as "PA66L-MB")
Using a ZSK-25 biaxial rotating extruder [manufactured by Werner & Pfleiderer Co.] which has one feed opening respectively at the upstream and at the downstream thereof, a temperature of the feed opening at the upstream to the feed opening at the downstream was set at 280° C., and that of the feed opening at the downstream to a die was set at 290° C. From the feed opening at the upstream, 90 parts by weight of PA66L was supplied, and from the feed opening at the downstream, 10 parts by weight of KB was supplied, and they were compounded to obtain a PA66L/KB master batch having a 10 wt. % of KB concentration. A number of revolutions of the screw was 400 rpm. Thereon, volatile components were removed from vent ports by which suction for vacuum is possible, provided at a position before the feed opening at the downstream and at a position before a die.
(5-2) PA66/KB Master Batch (Hereinafter Abbreviated as "PA66-MB")
The same procedure on producing PA66L-MB was conducted except that PA added from the feed opening at the upstream was changed to PA66, to obtain a PA66/KB master batch having a 10 wt. % of KB concentration.
(5-3) Polyamide 66/CNT Master Batch (Hereinafter Abbreviated as "CNT-MB")
A polyamide 66/CNT master batch manufactured by Hyperion Catalyst International (Trade name: Polyamide 66 with Fibril™ Nanotubes RMB4620-00) was used. A CNT concentration in the master batch is 20 wt.%.
(5-4) PPE/SEBS-L1/KB Master Batch (Hereinafter Abbreviated as "PPE-MB")
Using the same extruder as on producing PA66L-MB, all of the temperatures of the feed opening at the upstream to the dies were set at 320° C. From the feed opening at the upstream, 30 parts by weight of PPE and 60 parts by weight of SEBS-L1 were supplied, and from the feed opening at the downstream, 10 parts by weight of KB was supplied, and a PPE-MB master batch having a 10 wt. % of KB concentration was obtained. The number of revolutions of the screw was 300 rpm. In addition, volatile components were removed from vent ports by which suction for vacuum is possible, provided at a position before the feed opening at the downstream and at a position before a die.
(6) A Compatibilizer: a Maleic Anhydride (Hereinafter Abbreviated as "MAH")
[Measuring Methods]
<Specific Volume Resistance (Hereinafter Abbreviated as "VR")>
Both ends of a test piece for tensile test (ASTM D638 Type I Dumbbell bar) having a thickness of 3.2 mm were cut with a precision cut-off saw to obtain a test piece of a rectangular shape which possesses a length of 50 mm, and possesses a cut area having a uniform sectional area (12.4× 3.2 mm) at both ends. The cut areas at both ends of this test piece were coated with a silver paste, and were enough dried. After that, the value of resistance between the ends was measured with a circuit tester at an electric voltage of 1.5 V, and specific volume resistance was calculated by using the equation as shown below.

$$VR = (R \cdot w \cdot t)/l$$

wherein VR means specific volume resistance (Ω·cm), R is the value of resistance measured with a circuit tester(Ω), w is the width of a part coated with a silver paste (cm), t is the height of a part coated with a silver paste (cm), l is the distance between the areas which were coated with a silver paste (cm).

In this case, the measurement was carried out using 10 different test pieces, scattering is observed in some ranges, and therefore it was shown using the range.

<A Coefficient of Linear Expansion>

A center part of a test piece for tensile test having a thickness of 3.2 mm were cut with a precision cut-off saw to obtain a quadrangular pillar shape which has a thickness of 3.2 mm, a width of 5 mm, and a length of 10 mm. By using TMA-7 [manufactured by Perkin-Elmer Co.], a coefficient of linear expansion thereof was measured by raising a temperature thereof from 23° C. to 70° C. at a raising speed of 5° C./min, based on JIS K7197.

<An Amount of Fines Caused by Pelletizing Generated when Processing Of Extrusion is Conducted>

Ahead of a nozzle of the extruder, a strand bath and a pelletizer were provided, and a drawing speed of the pelletizer was controlled so that a diameter of the strand having passed in the water bath but before the pelletizer is in a range of 2 mm to 3 mm. Thereon, a length of the strand to be dipped in the water bath was made to be 100 cm. In this connection, water temperature was between 13° C. and 15° C.

Pellets from the pelletizer thereon were taken by about 100 g, and an accurate weight thereof was measured. The value is taken as W1.

Next, the pellets from the pelletizer of which an accurate weight was measured, were spread on a woven metallic wire screen of 20 mesh, and were well shaken. After fractionating pellets and fines caused by pelletizing, an accurate weight of the pellets remaining on the woven metallic wire was measured. The value is taken as W2.

The ratio of fines caused by pelletizing (W %) was calculated from W1 and W2 of these, by using the following equation.

The ratio of fines %=(1−W2/W1)×100

<Thermal Resistance (Hereinafter Abbreviated as "HDT")>

In accordance with ASTM D648, a deflection temperature under load was measured under load of 1.82 MPa. The measurement was conducted with 10 different test pieces, and HDT was determined by averaging the values of the deflection temperature measured.

<Fluidity (Hereinafter Abbreviated as "SSP")>

Using an injection molding machine IS-80EPN [manufactured by Toshiba Kikai Co., Ltd.], relative comparison was conducted based upon the values of a minimum injection pressure to form a test piece for tensile test (ASTM D638 Type I Dumbbell bar) [a minimum pressure necessary to form a test piece for tensile test] when an injection speed, cylinder temperatures and a mold temperature are set at a constant value. Since the comparison was conducted with the value of the injection pressure, and therefore when the value is lower, fluidity thereof is meant to be more excellent.

In this connection, a mold temperature was set at 80° C., and cylindrical temperatures at a nozzle to a hopper side were set at 290° C.-290° C.-280° C.-270° C. A cycle of the molding was an injection of 10 sec, cooling of 15 sec, and an interval of 2 sec. At least 20 shots of moldings were conducted, and measurement was conducted after a mold temperature was set at a constant value.

<Surface Appearance of a Molded Piece (Hereinafter Abbreviated as "Appearance of a Molded Piece")>

Using an injection molding machine IS-80EPN a molded piece of a plate shape which has a length of 90 mm, a width of 50 mm, and a thickness of 2.5 mm, were molded, and evaluation thereof was visually conducted. A molding condition thereon was the same as that on measuring SSP.

<Appearance After the Resin has Been Left Inside the Cylinder of the Molding Machine (Hereinafter Abbreviated as "Appearance After Left")>

Cylinder temperatures at a nozzle to a hopper side of an injection molding machine IS-80EPN were set at 310° C.-310° C.-300° C.-290° C. After about 20 molded pieces of a plate shape which have a length of 90 mm, a width of 50 mm, and a thickness of 2.5 mm, were molded, the molding machine was stopped for 2 min. and the resin composition was left in a cylinder. Then, molding was commenced, and appearance of the molded piece of a plate shape of the first shot was visually observed.

An evaluation of three stages was conducted as follows. When silver streaks ("silver") appears on the whole of a surface of the molded piece, it was taken as x, when even a little thereof appears on a surface of the molded piece, it was taken as Δ, and when nothing appears on a surface of the molded piece, it was taken as ○.

In this case, a mold temperature was set at 80° C., a pressure of injection was that of SSP. A cycle of the molding was an injection of 10 sec, cooling of 15 sec, and an interval of 2 sec.

Example 1, and Comparative Examples 1 and 2

Using a ZSK-40 biaxial extruder rotating in the same direction [manufactured by Werner & Pfleiderer Co.] which has one feed opening at the upstream and two feed openings at the downstream thereof (in the two feed openings at the downstream, the feed opening at the upstream is called as "the first feed opening at the downstream" and the feed opening at the downstream is called as "the second feed opening at the downstream"), a cylinder temperature of the feed opening at the upstream to the first feed opening at the downstream was set at 320° C., and that of the first feed opening at the downstream to a die was set at 280° C. From the feed opening at the upstream and the first feed opening at the downstream, each component was supplied as described in Table 1, and they were compounded to pelletize. On this pelletizing, an amount of fines caused by pelletizing generated was measured.

In this case, thereon, the number of revolutions of the screw was 300 rpm., and suction for vacuum was conducted at a position before the first feed opening at the downstream and a position before a die to remove volatile components.

The pellets obtained were injection molded by using an injection molding machine IS-80EPN to obtain various types of test pieces, and specific volume resistance and a coefficient of linear expansion were measured.

In this connection, a mold temperature was set at 80° C., and cylinder temperatures at a nozzle to a hopper side were set at 290° C.-290° C.-280° C.-270° C. A cycle of the molding was an injection of 10 sec, cooling of 15 sec, and an interval of 2 sec.

Each of the physical properties was also shown in Table 1.

In this case, a bad appearance such as lifting of a filler could not be observed in any sample.

TABLE 1

|  | Unit | Example 1 | Comp. Ex. 1 | Comp. Ex. 2 |
|---|---|---|---|---|
| Addition from feed opening at upstream |  |  |  |  |
| PPE | wt part | 30 | 30 | 30 |
| MAH | wt part | 0.2 | 0.2 | 0.2 |
| SEBS-L3 | wt part | 17 | 17 | 17 |
| KB | wt part | 2 | — | — |
| Addition from 1st feed opening at downstream |  |  |  |  |
| PA66L | wt part | 36 | 19 | 49.5 |
| KB | wt part | — | — | 3.5 |
| PA66L-MB | wt part | 15 | 34 | — |
| Total amount of electrically conductive filler | wt. % | 3.5 | 3.5 | 3.5 |
| Ratio of electrically conductive filler added at upstream (*1) | % | 57 | none | none |
| VR | $\Omega \cdot cm$ | $10^{5-6}$ | $10^{5-6}$ | $10^{5-8}$ |
| Coefficient of linear expansion | $\times 10^{-5} \, °C.^{-1}$ | 7.4 | 10.7 | 9.9 |
| Amount of fines generated | wt. % | 0.13 | 1.19 | 0.88 |

(*1) Ratio of electrically conductive filler added at upstream: a percentage of an electrically conductive filler added from a feed opening at an upstream based on all of a filler.

Examples 2 to 4, and Comparative Examples 3

The same procedure as in Example 1 was conducted except that from the feed opening at the upstream and the first feed opening at the downstream, each component was supplied as described in Table 2 to obtain pellets.

An amount of fines caused by pelletizing generated, specific volume resistance and a coefficient of linear expansion were measured.

Each of the physical properties was also shown in Table 2. No generation of bad appearance of a molded piece could be observed.

Even with the same amount of an electrically conductive filler, it has been proved that by adding a small amount of an electrically conductive filler from the feed opening at the upstream the Examples exhibit an excellent balance of volume inherent resistance and a coefficient of linear expansion as compared with the Comparative Example, and further at the same time, generation of an amount of fines caused by pelletizing is largely suppressed.

Examples 5 to 8

The same procedure as in Example 1 was conducted except that from the feed opening at the upstream and the first and the second feed openings at the downstream, each component was supplied as described in Table 3. HDT and fluidity (SSP) were also measured.

Each of the physical properties was also shown in Table 3. No generation of bad appearance of a molded piece could be observed.

TABLE 2

|  | Unit | Example 2 | Example 3 | Comp. Ex. 3 | Example 4 |
|---|---|---|---|---|---|
| Addition from feed opening at upstream |  |  |  |  |  |
| PPE | wt part | 33 | 33 | 33 | 33 |
| MAH | wt part | 0.2 | 0.2 | 0.2 | 0.2 |
| SEBS-H1 | wt part | 12 | 12 | 12 | 12 |
| KB | wt part | 1.1 | 1.5 | — | — |
| CNT-MB | wt part | — | — | — | 7.5 |
| Addition from 1st feed opening at downstream |  |  |  |  |  |
| PA66 | wt part | 45 | 49 | 35 | 43 |
| PA66-MB | wt part | 9 | 5 | 20 | 5 |
| Total amount of electrically conductive filler | wt. % | 2.0 | 2.0 | 2.0 | 2.0 |
| Ratio of electrically conductive filler added at upstream (*1) | % | 55 | 75 | none | 75 |
| VR | $\Omega \cdot cm$ | $10^{5-6}$ | $10^{5-6}$ | $10^{5-7}$ | $10^{5-7}$ |
| Coefficient of linear expansion | $\times 10^{-5} \, °C.^{-1}$ | 7.8 | 7.2 | 9.6 | 7.1 |
| Amount of fines generated | wt. % | 0.21 | 0.14 | 0.92 | 0.15 |

(*1) Ratio of electrically conductive filler added at upstream: a percentage of an electrically conductive filler added from a feed opening at an upstream based on all of a filler.

TABLE 3

|  | Unit | Example 3 | Example 5 | Example 6 | Example 7 | Example 8 |
|---|---|---|---|---|---|---|
| Addition from feed opening at upstream |  |  |  |  |  |  |
| PPE | wt part | 33 | 33 | 33 | 33 | 33 |
| MAH | wt part | 0.2 | 0.2 | 0.2 | 0.2 | 0.2 |
| SEBS-H1 | wt part | 12 | 8 | 4 | 4 | 4 |
| SEBS-L1 | wt part | — | — | 4 | 4 | 4 |
| SEBS-L2 | wt part | — | 4 | 4 | 4 | 4 |
| KB | wt part | 1.5 | 1.5 | 1.5 | 1.5 | 1.5 |
| Addition from 1st feed opening at downstream |  |  |  |  |  |  |
| PA66 | wt part | 49 | 49 | 49 | 49 | 49 |
| PA66-MB | wt part | 5 | 5 | 5 | — | 3 |
| Addition from 2nd feed opening at downstream | wt part | — | — | — | 0.5 | 0.2 |
| KB |  |  |  |  |  |  |
| Total amount of electrically conductive filler | wt. % | 2.0 | 2.0 | 2.0 | 2.0 | 2.0 |
| Ratio of electrically conductive filler added at upstream (*1) | % | 75 | 75 | 75 | 75 | 75 |
| VR | $\Omega \cdot cm$ | $10^{5-6}$ | $10^{5-6}$ | $10^{5-6}$ | $10^{5-6}$ | $10^{5-6}$ |
| Coefficient of linear expansion | $\times 10^{-5} \, °C^{-1}$ | 7.2 | 7.2 | 7.3 | 7.4 | 7.5 |
| Amount of fines generated | wt. % | 0.14 | 0.1 or less | 0.1 or less | 0.1 or less | 0.1 or less |
| SSP | MPa | 4.02 | 3.48 | 2.96 | 3.04 | 3.04 |
| HDT | °C. | 135 | 142 | 134 | 133 | 131 |

(*1) Ratio of electrically conductive filler added at upstream: a percentage of an electrically conductive filler added from a feed opening at an upstream based on all of a filler.

By comparing Example 3 with Example 5, it has been proved that HDT and fluidity are improved by using as an impact modifier a high molecular weight block copolymer and a low molecular weight block copolymer having a sufficient molecular weight polystyrene block and a high bound styrene content in combination.

Moreover, it has been proved that in Examples 6 to 8, wherein a blend of two types thereof having a different bound styrene content is used as a low molecular weight block copolymer, further fluidity has been improved.

Examples 10 to 12

The same procedure as in Example 1 was conducted except that from the feed opening at the upstream and the first feed opening at the downstream, each component was supplied as described in Table 4. Appearance after left was also measured. No bad appearance could be observed on a molded piece molded without being made to reside.

TABLE 4

|  | Unit | Example 10 | Example 11 | Example 12 |
|---|---|---|---|---|
| Addition from feed opening at upstream |  |  |  |  |
| PPE | wt part | 29 | 33 | 33 |
| MAH | wt part | 0.2 | 0.2 | 0.2 |
| SEBS-H1 | wt part | 4 | 4 | 4 |
| SEBS-L2 | wt part | — | 8 | 8 |
| PPE-MB | wt part | 13 | — | — |
| PA66-MB | wt part | — | 13 | — |
| KB | wt part | — | — | 1.3 |
| Addition from 1st feed opening at downstream |  |  |  |  |
| PA66 | wt part | 48 | 36 | 48 |
| PA66-MB | wt part | 7 | 7 | 7 |
| Total amount of electrically conductive filler | wt. % | 2.0 | 2.0 | 2.0 |
| Ratio of electrically conductive filler added at upstream (*1) | % | 65 | 65 | 65 |
| VR | $\Omega \cdot cm$ | $10^{5-6}$ | $10^{5-6}$ | $10^{5-6}$ |
| Coefficient of linear expansion | $\times 10^{-5} \, °C^{-1}$ | 7.8 | 7.9 | 7.8 |
| Amount of fines generated | wt. % | 0.1 or less | 0.1 or less | 0.1 or less |
| SSP | MPa | 2.67 | 3.54 | 2.60 |
| HDT | °C. | 123 | 124 | 121 |
| Appearance after left | ○, Δ, x | ○ | ○ | Δ |

(*1) Ratio of electrically conductive filler added at upstream: a percentage of an electrically conductive filler added from a feed opening at an upstream based on all of a filler.

It has been proved that by adding an electrically conductive filler, which is preliminarily compounded with an impact modifier and a polyphenylene ether, in the form of a master batch, appearance after the resin has been left in a molding machine can be abruptly improved while retaining other physical properties.

The present invention relates to a resin composition wherein a balance of electrical conductivity (specific volume resistance) and a coefficient of linear expansion is excellent, by optimizing a position of adding an electrically conductive filler and a ratio of addition thereof, to a method for producing the composition, and to a molded product composed of the composition.

What is claimed is:

1. An electrically conductive resin composition characterized by comprising a polyamide, a polyphenylene ether, an impact modifier and an electrically conductive filler, wherein not less than 50 wt. % of all of the filler used is preliminarily compounded with a mixture containing the impact modifier and the polyphenylene ether.

2. The composition according to claim 1, wherein the electrically conductive filler is added in the form of a master batch which is preliminarily compounded with at least one selected from the group consisting of the polyphenylene ether and the impact modifier.

3. The composition according to claim 1 or 2, wherein an amount of the electrically conductive filler which is preliminarily compounded with a mixture containing the impact modifier and the polyphenylene ether, is not less than 70 wt. % when that of all of the filler used is considered as 100 wt. %.

4. The composition according to claim 1, wherein the impact modifier is at least one selected from the group consisting of a block copolymer of an aromatic vinyl compound and a conjugated diene compound, a hydrogenated product thereof, and an ethylene-α-olefin copolymer, wherein the block copolymer of an aromatic vinyl compound and a conjugated diene compound comprises a polymer block segment (A) mainly composed of an aromatic vinyl compound and a polymer block segment (B) mainly composed of a conjugated diene compound, and a linking structure of the polymer block segments is at least one selected from the group consisting of an AB type, an ABA type, and an ABAB type.

5. The composition according to claim 4, wherein the impact modifier is a hydrogenated product of a block copolymer of an aromatic vinyl compound and a conjugated diene compound.

6. The composition according to claim 4, wherein the impact modifier is a mixture of an impact modifier having a number average molecular weight of not less than 120,000 and a block copolymer of an aromatic vinyl compound and a conjugated diene compound having a number average molecular weight of less than 120,000.

7. The composition according to claim 6, wherein a number average molecular weight of a polymer block mainly composed of an aromatic vinyl compound of the impact modifier having a number average molecular weight of less than 120,000, is not less than 20,000.

8. The composition according to claim 6, wherein the impact modifier having a number average molecular weight of less than 120,000, is a block copolymer containing not less than 55 wt. % and less than 90 wt. % of an aromatic vinyl compound.

9. The composition according to claim 1, wherein the electrically conductive filler is at least one selected from the group consisting of an electrically conductive carbon black, a carbon nanotube, a carbon nanofiber, a carbon fiber, and graphite.

10. The composition according to claim 1, wherein the electrically conductive filler is at least one selected from the group consisting of an electrically conductive carbon black, a carbon nanotube, and a carbon nanofiber.

11. The composition according to claim 1, wherein an amount of the electrically conductive filler is 0.1 to 3 parts by weight when that of all of the components other than the electrically conductive filler is considered as 100 parts by weight.

12. The composition according to claim 1, wherein an amount ratio of a polyamide, a polyphenylene ether and an impact modifier is in the range of 30 to 70 parts by weight of a polyamide, 20 to 50 parts by weight of a polyphenylene ether, and 5 to 30 parts by weight of an impact modifier when the amount of the total of these three components is considered as 100 parts by weight.

13. The composition according to claim 1, wherein not less than 50 wt. % of the electrically conductive filler is preliminarily compounded with a mixture containing an impact modifier and a polyphenylene ether, and thereafter the rest of an electrically conductive filler is compounded in the presence of a polyamide.

14. The composition according to claim 13, wherein the whole or a part of the rest of an electrically conductive filler is added with a polyamide.

15. The composition according to claim 13, wherein the whole or a part of the rest of an electrically conductive filler is added after a polyamide and a polyphenylene ether are compounded, and is compounded.

16. The composition according to claim 14, wherein the electrically conductive filler which is added with a polyamide, is added in the form of a polyamide master batch which is preliminarily compounded with a polyamide.

17. The composition according to claim 16, wherein the electrically conductive filler in the polyamide master batch is an electrically conductive carbon black.

18. The composition according to claim 17, wherein an amount of the electrically conductive carbon black in the polyamide master batch is 8 wt. % to 13 wt. %.

19. The composition according to claim 16, wherein the electrically conductive filler in the polyamide master batch is at least one selected from the group consisting of a carbon nanotube and a carbon nanofiber.

20. The composition according to claim 19, wherein an amount of the carbon nanotube and/or the carbon nanofiber in the polyamide master batch is 15 wt. % to 40 wt. %.

21. The composition according to claim 16, wherein the polyamide master batch is obtained by compounding, after a polyamide is melted and the electrically conductive filler is added.

22. The composition according to claim 13, wherein an amount of the electrically conductive filler which is compounded in the presence of a polyamide, is 50 wt. % based on that of all of the electrically conductive filler used.

23. The composition according to claim 13, wherein an amount of the electrically conductive filler which is compounded in the presence of a polyamide, is less than 30 parts by weight when that of all of the electrically conductive filler used is considered as 100 parts by weight.

24. A process for producing an electrically conductive resin composition comprising a polyamide, a polyphenylene ether, an impact modifier and an electrically conductive filler, wherein not less than 50 wt. % of all of the filler used is preliminarily compounded with a mixture containing the impact modifier and the polyphenylene ether.

25. The process according to claim 24, wherein a part of the electrically conductive filler is preliminarily compounded with a mixture containing an impact modifier and a polyphenylene ether, and thereafter the rest of an electrically conductive filler is compounded in the presence of a polyamide.

26. The process according to claim 25, wherein the whole or a part of the rest of an electrically conductive filler is added with a polyamide.

27. The process according to claim 27, wherein the whole or a part of the rest of an electrically conductive filler is added, after a polyamide and a polyphenylene ether have been compounded, and is compounded.

28. A molded article for an exterior use of an automobile comprised of the electrically conductive resin composition according to claim 1.

* * * * *